United States Patent
Farmanbar et al.

(10) Patent No.: US 8,400,444 B2
(45) Date of Patent: Mar. 19, 2013

(54) METHOD TO RENDER A ROOT-LESS SCENE GRAPH WITH A USER CONTROLLED ORDER OF RENDERING

(75) Inventors: Khashayar Farmanbar, Nacka (SE); Tomas Karlsson, Råneå (SE)

(73) Assignee: Agency 9AB, Lulea, Danderyd (SE)

( * ) Notice: Subject to any disclaimer, the term of this patent is extended or adjusted under 35 U.S.C. 154(b) by 799 days.

(21) Appl. No.: 12/096,151

(22) PCT Filed: Dec. 7, 2006

(86) PCT No.: PCT/SE2006/001394
§ 371 (c)(1),
(2), (4) Date: Jun. 4, 2008

(87) PCT Pub. No.: WO2007/067131
PCT Pub. Date: Jun. 14, 2007

(65) Prior Publication Data
US 2008/0278482 A1    Nov. 13, 2008

Related U.S. Application Data

(60) Provisional application No. 60/597,538, filed on Dec. 8, 2005.

(30) Foreign Application Priority Data

Dec. 8, 2005   (SE) ..................... 0502704

(51) Int. Cl.
G06T 15/00   (2011.01)
(52) U.S. Cl. ........................ 345/418
(58) Field of Classification Search ............ None
See application file for complete search history.

(56) References Cited

U.S. PATENT DOCUMENTS

| | | | |
|---|---|---|---|
| 5,896,139 A * | 4/1999 | Strauss ................. | 345/440 |
| 6,154,215 A * | 11/2000 | Hopcroft et al. .......... | 345/418 |
| 6,266,053 B1 * | 7/2001 | French et al. ............ | 715/255 |
| 6,307,558 B1 | 10/2001 | Mao | |
| 6,373,489 B1 | 4/2002 | Lu et al. | |
| 6,570,564 B1 | 5/2003 | Sowizral et al. | |
| 6,839,062 B2 | 1/2005 | Aronson et al. | |

(Continued)

FOREIGN PATENT DOCUMENTS

| WO | WO 01/22370 A1 | 3/2001 |
|---|---|---|
| WO | 2004008303 A2 | 1/2004 |

OTHER PUBLICATIONS

International Search Report.

(Continued)

*Primary Examiner* — Daniel Hajnik
*Assistant Examiner* — Andrew G Yang
(74) *Attorney, Agent, or Firm* — Moore & Van Allen, PLLC; W. Kevin Ransom

(57) ABSTRACT

A scene graph is provided which represents data and a set of processes thus providing an enhanced approach to the previously known scene graph concept. With this approach the scene graph becomes a rendering description of the data rather than a world description. Previously known scene graphs represent a structure of objects and their attributes. The scene graph has a notation of the traversing order, which together with the types of nodes, the nodes position, node functionality and node state determine the rendering order. Thus, any effects supported by the underlying rendering pipeline can be expressed directly in the scene graph by the user. An API is provided for the scene graph, controlling the actual rendering order and optimization to the user. The scene graph is extensible allowing the user to experiment and express new rendering algorithms in the scene graph semantic.

20 Claims, 7 Drawing Sheets

U.S. PATENT DOCUMENTS

| | | | |
|---|---|---|---|
| 6,933,941 B1* | 8/2005 | Peercy et al. | 345/428 |
| 7,290,216 B1* | 10/2007 | Kawahara et al. | 715/762 |
| 7,444,595 B2* | 10/2008 | Fournie | 715/763 |
| 7,596,764 B2* | 9/2009 | Vienneau et al. | 715/853 |
| 2001/0030647 A1* | 10/2001 | Sowizral et al. | 345/420 |
| 2002/0051005 A1 | 5/2002 | Trinh et al. | |
| 2003/0011637 A1 | 1/2003 | Boudier | |
| 2003/0222883 A1 | 12/2003 | Deniau et al. | |
| 2004/0051728 A1* | 3/2004 | Vienneau et al. | 345/723 |

OTHER PUBLICATIONS

Insinger, Chris: "Fahrenheit Scene Graph—An Introduction to Scene Graph Technology"; Internet Citation 1999, pp. 1-21, XP002542129; [Internet] URL:http://www.cvmt.dk/education/teaching/f04/ComputerGrpahics2/fahrenheit-scene.pdf.

Thomas, C.S. et al: "A Practical Implementation of a 3-D Game Engine"; Computer Graphics, Imaging and Vision : New Trends, 2005. International Conference on Beijing, China, Jul. 26-29, 2005, Piscataway, NJ; IEEE Jul. 26, 2005; pp. 351-358.

Hofmann, Jonathan Scott: "The Render Graph: A Data Structure to Aid in the Interactive Display of Scene Graph Data"; Thesis submitted to The School of Engineering and Applied science of The George Washington University; Jan. 31, 2003, pp. 1-49; XP002648045; [Internet] URL:http://www.icg.seas.gwu.edu/Publicatons/RenderGraph.pdf.

European Search Report for EPO Application No. 06824520.8, dated Jul. 18, 2011.

* cited by examiner

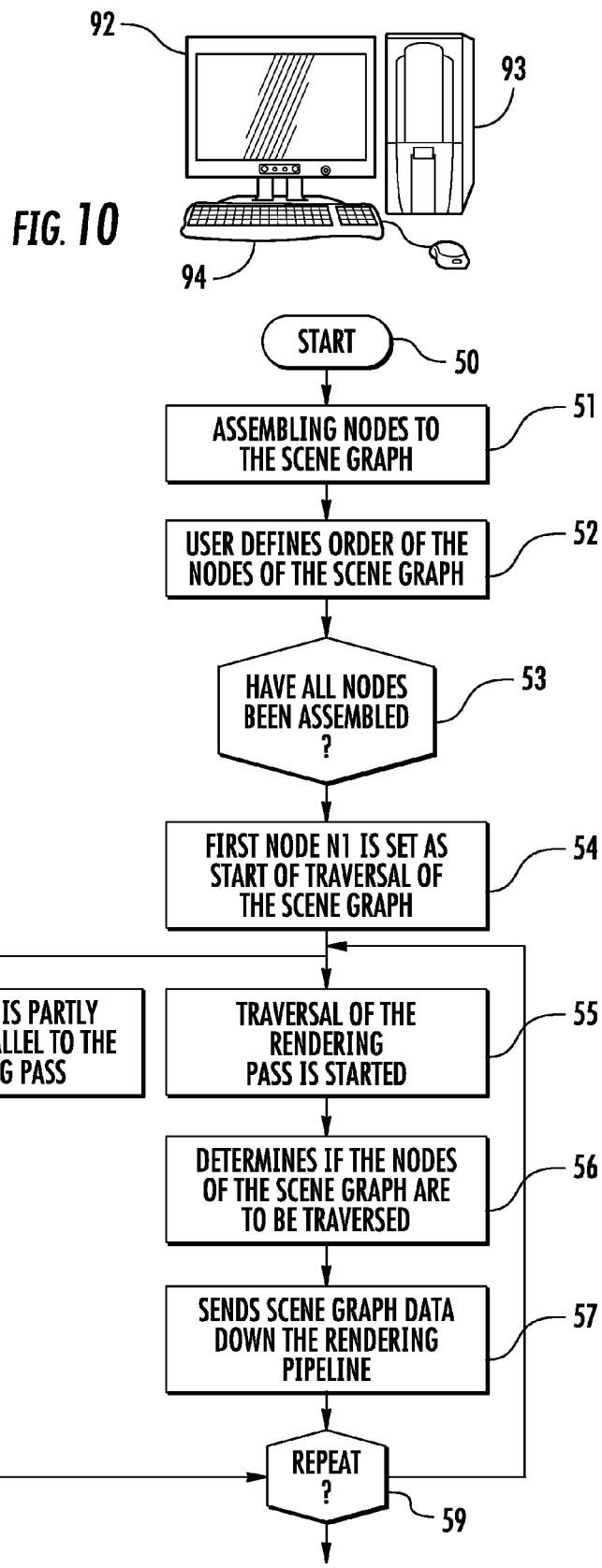

METHOD TO RENDER A ROOT-LESS SCENE GRAPH WITH A USER CONTROLLED ORDER OF RENDERING

CROSS REFERENCE TO RELATED APPLICATIONS

The present application claims priority to U.S. Provisional Patent Application Ser. No. 60/597,538 titled "A Method To Render A Root-Less Scene Graph With A User Controlled Order Of Rendering" filed on Dec. 8, 2005.

TECHNICAL FIELD

This invention relates generally to the field of computer graphics and, more particularly, to graphics systems and methods that manage and render three-dimensional graphics data by means of scene graph.

BACKGROUND ART

The digital entertainment industry has taken a lead in creating realistic real time environments where the user can interact with the environment and others. Real time 3D graphics is also used in the industry where it is used in many different areas such as medical and health care for visualizing of the human body and in telematics where it is used in navigation and positioning. The ever growing ability to create a more realistic world on a screen has also created a new field of training systems, serious gaming, where for example a fighter pilot trains before combat or a surgeon prepares himself before a complicated operation. The real time 3D graphics industry has also gone mobile with next generation mobile phones, which have the graphics and computing power to create stunning results.

The hardware is typically built around a Central Processing Unit (CPU)/and Graphics Processor Unit (GPU). The CPU is the unit controlling the interpretation of program instructions and their execution. It receives and sends data through input-output channels, retrieves data and programs from memory, and conducts mathematical and logical functions of a program. There are many alternative terms to a CPU, such as processor or embedded system. Other examples on equivalents are a Parallel Computing System or a Multi Processor System. The GPU is a specialized processor, designed to draw 3D graphics. As such, it's much faster for typical tasks involving 3D graphics than the processor is. Many other terms may be used for the GPU. The CPU/GPU are typically connected over a bus, such as AGP or PCIx on a PC system. Many GPU systems today have their own dedicated memory. This architecture can both be found in modern PC and workstations as well as future handhelds, mobile phones, game consoles and other similar units. The CPU and GPU on a PC are often connected through a high-speed bus such as AGP or PCIx. This design has created a breakthrough in graphics computer power since the GPU can be optimized to handle graphically intensive tasks. Since the GPU is task oriented the speed of the GPUs has increased faster than Moore's law. The trend is also that the CPU is either multicore and/or multiprocessor type with the ability to handle threads in parallel.

The industry growth has created a need for programmers' and developers' tools for doing rapid development of 3D applications. Today there are basically two different industry standards, OpenGL and Direct3D, which both offer a GPU and vendor independent way of communicating in a CPU/GPU environment. Direct3D is generally available for platforms from Microsoft Corporation. OpenGL is available on PC and workstations as well as handhelds, gaming consoles and embedded environments in the form of OpenGL ES. Both OpenGL and Direct3D have been designed as low-level abstractions close to the machine hardware. Due to low-level abstraction both OpenGL and Direct3D are complex and difficult to master. In a large and complex development environment with multiple developers this has become even more apparent. In such a development environment a single non-intended state change in OpenGL is likely to have a negative impact and it may crash the rest of the application. Several attempts to create a higher abstracted development model have been made based on Open GL but with varying results. One of the most novel ideas has been the idea representing the graphic data in a graph, known as a Scene Graph. The idea is that the developer attaches one or more transforms nodes to a root node and then a 3D object with a set of attributes defining the objects. This approach has been implemented both as script languages such as VRML, and as a programming APIs, for example in Java3D from SUN Microsystems. Both implementations have succeeded in reducing the complexity of the application development. A problem with the previous known scene graphs is a relatively high cost of speed during runtime. Another problem with the known scene graphs is that the developer does not have control of all aspects of rendering nodes and objects. Additionally there are other related problems with the previous known scene graphs that need to be solved to meet the developer community demands. A particular problem for many developers is the insufficient ability of the suppliers of the previously known scene graphs, and their related APIs, to adapt to the rapid development of the GPU and the ever increasing number of rendering algorithms.

Java3D has been designed to be inherently multithreaded and rendering order independent. When traversing a scene graph, the Java3D process starts from a virtual universal proceeds. The order of traversal is not defined and the actual location of the node has no meaning for the final result, only the path from the root to a leaf. The approach in Java3D is that the user describes a set of objects and their attributes in the scene graph. Further, the approach in Java3D comprises that the scene graph data is assembled and data is put into render bins. A similar approach can be found in graphs like VRML. Each render bin is then responsible for programming the rendering pipeline. The render bins are parallel structures and their internal order of execution is out of user's control and different threads often execute different bins.

This approach makes it very hard and often impossible for the developer to describe new novel rendering algorithms since the final result is order dependent. There is no natural way in the scene graph semantics to describe an algorithm. Thus making it difficult for Java3D developers to adapt to rapid development of the GPU and rendering theory. Developers dependent on new versions still strive to incorporate their needs and ideas. The difficulties also limit developers' ability to innovate and create new effects never seen before.

The patent application publication US2001/0030647 describes a system and a method for processing of scene-graph-based data and/or programs. Structures and threads may be configured to convey information about state changes through the use of messaging. The system may include support for messaging between threads, messaging with time and/or event stamps, epochs to ensure consistency and ancillary structures such as render-bins, geometry structures and rendering environment structures. The patent application describes the Java3D API. The patent application describes a system that has the previously mentioned problems, such as that the Java 3D programmer does not have control over the rendering order of objects. Another remaining problem is that the programmer does not have the possibility to use a new algorithm from a GPU vendor unless supported by the Java3D API.

U.S. Pat. No. 6,683,9062 from Microsoft Corporation describes that semantics usage allows shaders to be authorised independently of the actual vertex data and accordingly enables their reuse. This allows developers to program the shaders in the assembly and high-level language with variables that refer to names rather than registers. By allowing this decoupling of registers from the language, developers can work on the language separately from the vertex data and modify and enhance high-level language shaders without having to manually manipulate the registers. This also allows the same shaders to work on different sets of mesh data, allowing the shaders to be reused. In general, semantics can be used as a data binding protocol between distinct areas of the rendering pipeline to allow more flexible workflow. However, even though user semantics enable a higher abstraction level, such as a description of uniforms, it does not address the use of a scene graph and states still have to be manually assigned to the rendering pipeline. An alternative term to rendering pipeline is programmable pipeline.

It is desired to have a method and system that supplies an API for 3D graphics development on a high abstraction level, that, to a great extent, is platform independent and allows programmers to work in scene graph environment, with the programmer controlling the rendering order, and the programmer has the ability to use the latest algorithms, such as features from the GPU vendor, without having to upgrade the system software such as Java3D.

SUMMARY OF THE INVENTION

An aim is that the above-mentioned problems are solved by a method and a computer program for rendering a scene graph as described herein. An object of the invention is to provide a method and a computer program for rendering a scene graph comprising 3D graphical data in a computerized system, the method and system enabling more efficient rendering in a CPU/GPU environment, to overcome limitations in previous known scene graphs. A CPU/GPU environment is not restricted to a PC or server, but is also valid for other types of devices with a separate unit handling graphics. An example of such a device is a mobile phone. Another example is system-comprising glasses with visualizing capabilities.

The invention provides a scene graph, which represents data and a set of processes thus providing an enhanced approach to the scene graph concept. With this approach the scene graph becomes a rendering description of the data rather than a world description. Previously known scene graphs represent a structure of objects and their attributes. This approach can be found, for instance, in environments based on Java3D or VRML. An advantage of the invention can be explained in the term of transparency. In the Java3D approach transparency is a surface attribute where, as in the embodiment of the invention, transparency is a rendering algorithm based on the rendering order, which is user defined, and optionally applied on a blending process. This fundamental difference removes the previous limitations and allows the user to express new algorithms directly in the scene graph, in terms of processes and rendering order. The scene graph has a notation of the traversing order, which together with the types of nodes, the nodes position, the nodes functionality and nodes state determine the rendering order. Thus the user can express any effects supported by the underlying rendering pipeline directly in the scene graph.

A further object is to provide an API for the scene graph that is easy to use, still giving control of the actual rendering order and optimization to the user. The scene graph is extensible allowing the user to experiment and express new rendering algorithms in the scene graph semantics. The semantics of the scene graph allows the user to express optimizations. The scene graph is particularly suitable for a CPU/GPU environment, or similar. The API and the scene graph semantics enable the user to optimize rendering in computerized systems with both single and multiple CPU.

The invention enables the user to add an additional node to the scene graph, where the order in which scene graph data is sent down the rendering pipeline, depends on the position of the added node in the scene graph and its state. An added node may have a number of children. The added node and its children may comprise a rendering algorithm for 3D graphical presentation. In contrast to other scene graphs the rendering algorithm is previously unknown to the system software traversing the tree. In other previously known scene graphs such algorithms for 3D graphical presentations are not possible for a user to access, unless the system software is updated with a version supporting the algorithm. Functions of the new algorithm may have its origins from the vendor of the graphical board comprising the GPU. It may, for instance, be a new algorithm for handling reflections in surfaces such as glossy furs.

Yet another feature of the scene graph is the ability for the user to extend a node so that certain state of the node is used to determine if children of the node are to be traversed. Such an extended node enables the user to optimize the algorithm.

The scene graph is constructed by assembling a set of nodes thus creating a directed acyclic graph. In contrast to previously known scene graphs, any node may be set as a starting point node for scene graph traversal. The node may be a base class the scene graph is built from and defines the traversing order of its children. A node typically keeps a list of its children and any node can be added as a child to another node. The scene graph is traversed from top to bottom, left to right (or right to left). All scene graph nodes guarantee this traversal order. A user can extend any node and add restrictions related to in how the user defined order should be traversed. In one embodiment the restriction relates to if a condition, regarding the state of a node is fulfilled at the time of a rendering pass. This gives the user total control over the traversal order and the rendering process. This also enables the user to build render order dependent optimizations, directly into the graph, this in contrast to earlier known scene graphs and their related APIs. A rendering API, according to the invention, is separated from the underlying hardware API, such as Direct3D or OpenGL.

Traversal of the scene graph is repeated number of times per second. The node where to start traversal of the scene graph may be changed by the user from one traversing pass to the next. Traversal of the scene graph is defined in two passes; the update and the render pass. This design is preferable in order to be able to optimize the use of hardware structure, such as to maximize the Asymmetrical Multi Process (ASMP) behaviour of the CPU/GPU architecture. The update pass may be time dependent and utilize only CPU resources. The intended use is to update states of nodes and perform CPU heavy calculations such as animation and geometry deformations in the update pass. The update pass can be run as single or multithreaded, both on traversal and node levels without need of synchronization. The render pass communicates with the GPU and uses as little CPU resources as possible. The two passes allow the user to optimize the system for the best possible ASMP behaviours. The architecture allows multithreaded CPU behaviour on each node in the render pass but not on the actual traversal. With a single threaded traversal, data can be sent down the rendering pipeline as fast as possible without any synchronization. Multithreaded traversal, when rendering, makes less sense since all rendering in the end is more or less order dependent. When the data has been sent down the pipeline the GPU can start processing data independently from CPU. As the GPU is processing geometry the CPU resources can be assigned to the update pass. The separation of update and render also allows partitioning resources between frames, where only parts of a frame need to be updated in each frame.

The scene graph comprises two different basic types of nodes: Transform and Components. A transform node affects the different transform stages defined in the render pipeline: the transform matrix, the projection matrix and the color matrix. When traversing the tree, transform nodes are multiplied creating a hierarchical relationship in space. The component nodes define data, a process or a combination from there on. When traversing the scene graph two-component nodes of the same type replace each other.

BRIEF DESCRIPTION OF THE DRAWINGS

The present invention will be described in detail in connection with the enclosed schematic drawings.

FIG. 10 is a block diagram representing an exemplary computer system into which the present invention may be incorporated.

FIG. 11 is a flow chart of a method. A computer program according to the invention implements all steps or a sub-set of the steps.

DETAILED DESCRIPTION OF THE INVENTION

Rendering

Figure 1:
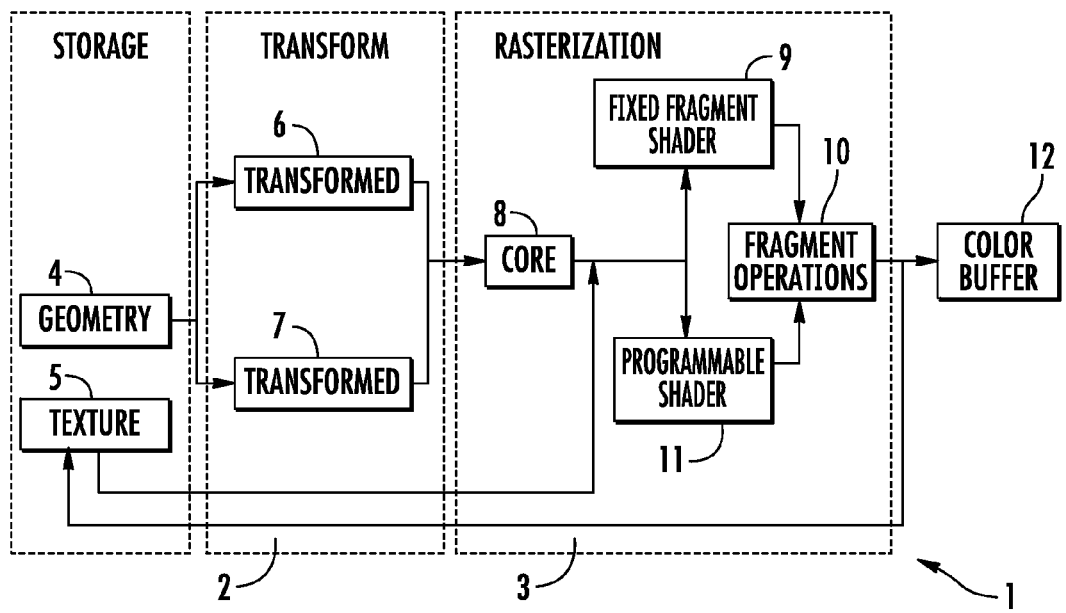
FIG. 1 is a schematic overview of the rendering process.

In embodiments of the invention rendering is used to generate a 3D image. FIG. 1 is a schematic overview of the rendering pipeline 1. Geometry 4 and texture 5 are held in storage. In the rendering pipeline 1 patches, often triangles, are transformed 6, 7 and then projected on to a view plane by a set of matrices. The projected triangles are then culled and clipped and passed down to a rasterization process 3. In the rasterization process 3 fragments are created and passed on to a fixed fragment shader 9 or a programmable shader 11 where they are textured 5 and possibly lit, i.e. shaded. The fragment then passes to fragment operations 10. The rendering pipeline 1 further comprises a series of tests, such as z-buffer and stencil tests, which may be performed in the core 8 of the rasterization process. If it passes these tests the fragment eventually becomes a pixel in the color buffer 12 of FIG. 1, where it either is replaced or blended with an existing pixel occupying the location. One characteristic of rendering is that rendering is order dependent. Exactly the same patches rendered in a different order might yield a completely different result. A typical evidence of this is transparency. In one embodiment OpenGL will calculate the result of blending two pixels based on the equation:

$$(R_sS_r+R_dD_r, G_sS_g+G_dD_g, B_sS_b+B_dD_b, A_sS_a+A_dD_a)$$

The s and d subscripts specify the source and destination pixels. The S and D components are the blend factors. These values indicate how you would like to blend the pixels. The most common values for S and D are; $(A_s, A_s, A_s, A_s)$ known as source alpha for S, and $(1, 1, 1, 1)-(A_s, A_s, A_s, A_s)$ for D. This yields a blending equation that looks like:

$$(R_sA_s+R_d(1-A_s), G_sA_s+G_d(1-A_s), B_sA_s+B_d(1-A_s), A_sA_s+A_d(1-A_s))$$

The above equation yields transparent/translucent style effects. If one looks at the red component of the blend equation we get and use the given pixels:

$$\{R_s, G_s, B_s, A_s\}=(0.1, 0.3, 0.5, 0.2);$$

$$\{R_d, G_d, B_d, A_d\}=(1,1,1,1);$$

$$(0.1*0.2+1(1-0.2)=0.82$$

Shifting the rendering order one gets:

$$\{R_s, G_s, B_s, A_s\}=(1,1,1,1);$$

$$\{R_d, G_d, B_d, A_d\}=(0.1, 0.3, 0.5, 0.2);$$

$$(1*1+0.1(1-1))=1$$

On the GPU side the rendering is typically built in a pipeline architecture. A pipeline architecture has the advantage that it increases the polygon through put, if it has a steady state and steady flow of data. With previously known scene graphs such rendering gives a penalty when interrupted since the pipeline needs to be flushed to adapt to changes.

Assembling

The scene graph 40 is constructed by assembling a set of nodes thus creating a directed acyclic graph, which is the scene graph 40. The node is the base class the scene graph is built from and defines the traversing order of its children. A node keeps a list of its children and any node can be added as a child to another node. Example of a node is a node describing texture, geometry, or a transform. The scene graph 40 is traversed in a top to bottom, left to right manner. All scene graph nodes guarantee this traversal order. A method according to the invention renders a scene graph 40 that comprises 3D graphical data. The method comprises the step of assembling nodes defined by the user to the scene graph 40. The scene graph 40 resembles directed acyclic graph.

Traversing

Figure 5:
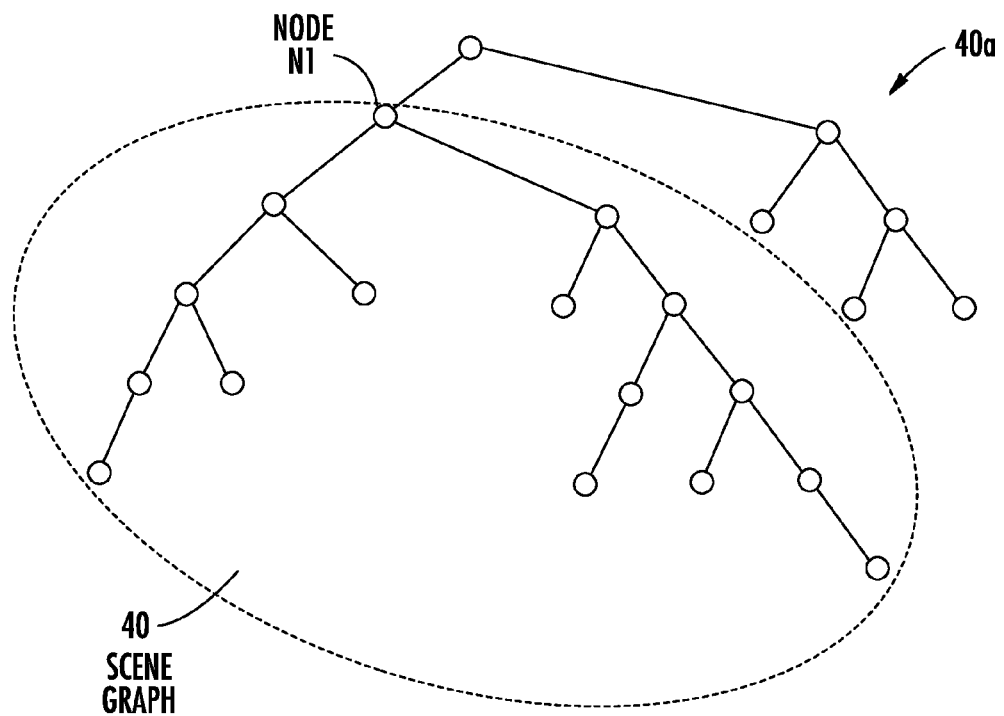
FIG. 5 is a scene graph in which a node, other than top node, is set to start rendering the tree.

Further, the method comprises the additional step of setting, or rather the user choosing, the node N1 from where to start traversing the scene graph 40. In one embodiment, setting the node N1 involves evoking a rendering method of the node N1 itself. In another embodiment the node N1 may be used as a parameter in a rendering call, however the setting step does not typically involve setting a parameter that is stored. A part 40 of the complete scene graph 40a that is traversed is shown in FIG. 5. In contrast to previously known scene graphs, any node of the scene graph 40 may be chosen as a position to start traversing. In previously known scene graphs the rendering starts at the top of the tree, such as at Virtual Universe node.

During the traversal of the scene graph 40, each node is evaluated to see if it is extended. If a node is extended at least one state of the node is used to determine if children are to be traversed. This enables the user to increase the performance of the traversing pass, as well as the performance of the rendering pipeline 1, since all nodes need not be traversed. The state may obviously change between different times traversing the scene graph 40. Hence, a node, and its children, which are excluded from being sent down the rendering pipeline 1 when traversing the scene graph 40 at a first time, may be sent down the rendering pipeline 1 at a second time when traversing the scene graph 40. This depends on that the state of the node, which may change between these two times, is used to determine if children are to be traversed.

Scene graph data is sent down the rendering pipeline 1 based on an order, defined in the scene graph 40 by the user. This order is based on depth first, top-down, rigt-left order. The data and processes, such as defining an algorithm for graphical representation of the scene graph 40, determine in which order data is sent down the rendering pipeline 1.

Rendering Order

Figure 6A:
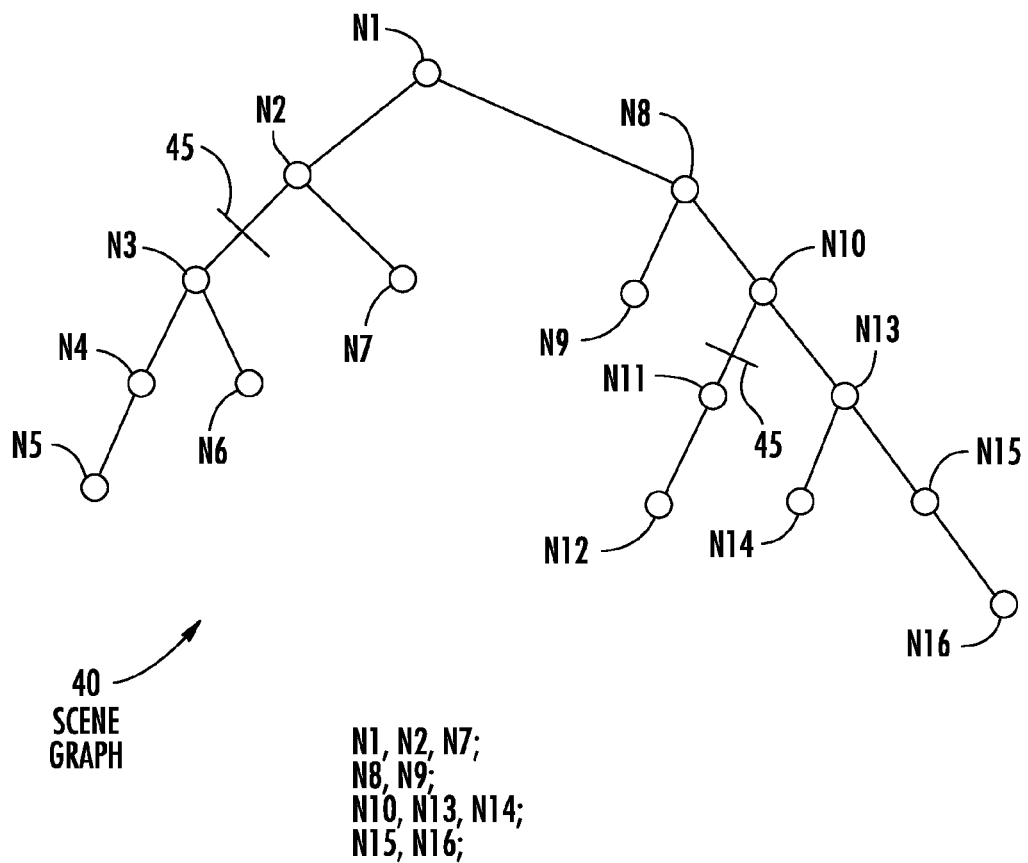
FIG. 6a is a scene graph. By means of the API, the user controls the order node data, such as components and transforms which are sent down the rendering pipeline.

FIG. 6a shows that the structure of the scene graph 40 has an impact on the rendering order. That means that components from nodes N1-N16 are sent down the rendering pipeline 1 depending on position in the scene graph 40.

In the example, there are numbers of restrictions assigned to states of nodes. In FIG. 6a, lines between nodes indicate restrictions 45. Node N3 and node N11 in FIG. 6a are extended nodes and each has, at the time of traversing the scene graph 40, a state that may restrict traversing of their children. The restriction may also involve that components and transforms of the node, such as N3 and N11, are excluded from being sent down the rendering pipeline 1. In the example, in FIG. 6a draw nodes are nodes leaves at the end of the branches, in FIG. 6a draw nodes would be N5, N6, N7, N9, N12, N14, N16. In an embodiment, it is a draw node that initiates the actual draw of graphics, such as triangles, on a screen while the components may communicate with the rendering pipeline 1 as they have been traversed during the render pass. In one embodiment of the invention the rendering is made in such a way that data, for instance components of nodes, are sent only once down the rendering pipeline 1. The scene graph 40 in itself handles optimization of components sent down the rendering pipeline 1. In such embodiment the rendering order of the scene graph 40 of FIG. 6a is:

N1, N2, N7;
N8, N9;
N10, N13, N14;
N15, N16;

In an alternative embodiment the order of data, such as components and transforms, from nodes in FIG. 6a are:

N1, N2, N7;
N1, N8, N9;
N1, N8, N10, N13, N14;
N1, N8, N10, N13, N15, N16;

Such embodiment may be preferred if states of nodes are allowed to be updated during the rendering pass.

An advantage of the approach with draw nodes is that they enable the user to control rendering. For instance, a draw node 7 initiates that a set of node data, such as N1, N2, N7, are sent down the rendering pipeline. This means that components, transforms and processes are handled in rendering pipeline, before the end of the traversal of all nodes during the rendering pass. This contrasts the previously known scene graphs where rendering bins, and many other data sorting techniques, are used before data is sent further down the rendering pipeline 1.

Figure 6B:
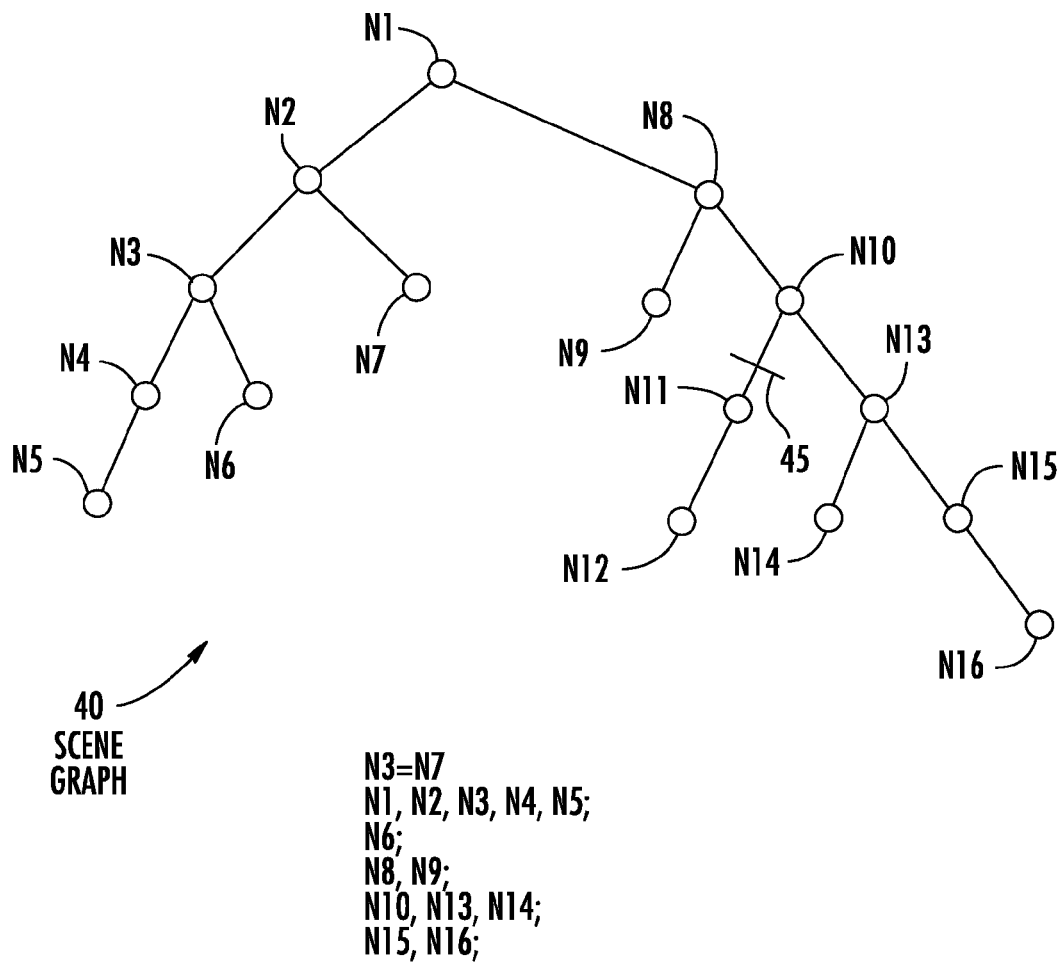
FIG. 6b is a scene graph in which lazy evaluation is used to enable an efficient rendering mechanism.

In a preferred embodiment an appearance function handles node data before it is further sent down to the rendering pipeline 1. This approach may be seen as lazy evaluation. It is preferred that the appearance function is embedded in the appearance node N1 at the top of the scene graph 40. With the appearance node in the scene graph, components relating to certain aspects such as texture are sent only once. In the scene graph of FIG. 6b, the nodes N3 and N7 comprise components that relate to the same aspects of an object, such as texture. The order of components of nodes sent down the rendering pipeline 1 from nodes, of the left branch, of FIG. 6b is:

N1, N2, N3, N4, N5;
N6;

FIGS. 6a and 6b show that the user has control of the rendering order of the scene graph 40. This in contrast to previously known scene graphs, where the user lacks control of the actual order of node data sent down the rendering pipeline, since the order in those cases is handled by system software. For instance, in Java 3D certain data is handled by render bins. The invention does not rely on render bins. Nor does the invention depend upon that optimization of the rendering order, made by system software, for instance, after adding an additional node.

Adding a Node

The method enables the user to change and control the rendering order of the scene graph 40. This may be achieved by a set of user's actions via graphical user interface or by means of user defined program. The method enables the user to add an additional node with a number of children.

Figure 7:
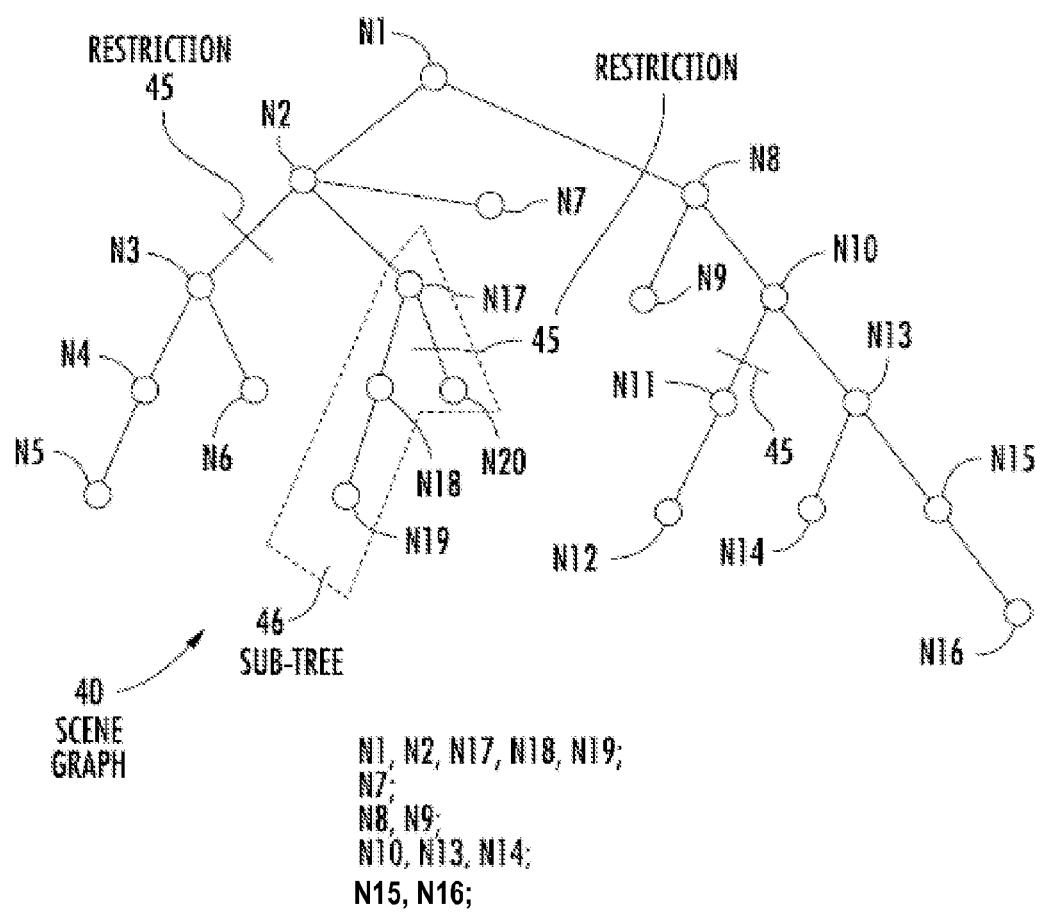
FIG. 7 is a scene graph to which a node N17 is added and children are extended. The figure exemplifies how extended nodes and their states enable the user to control node data being sent down the rendering pipeline.

The invention enables that the added node, such as node N17 shown in FIG. 7, comprises an algorithm for 3D graphical presentation. FIG. 7 further shows that the node N17 may have a number of children making up a sub-tree N46. In contrast to other scene graphs the algorithm is previously unknown to the system software traversing the tree 40. The scene graph enables the user to access algorithms for 3D graphical presentation, without the system software being updated with a version supporting the algorithm. The new algorithm may comprise processes and functions originating from the vendor of the GPU 91. It may, for instance, be a new algorithm for handling reflections in surfaces such as glossy furs. The scene graph data with the added node N17 is sent down the rendering pipeline 1 in the new order defined by the user. And this is performed without updating the system software traversing the scene graph. The added node N17 or any of its children may earlier have been extended, comprising a state that restricts children from being traversed, providing that the condition is fulfilled. Lines between nodes indicate restrictions 45 in FIG. 7.

In the example in FIG. 7 of a scene graph 40 where the node N17 is added, the added node N17 has a number of children, which resembles a sub-tree 46. The children are N18, N19 and N20. Each leaf of the scene graph 40 is a drawn node. In the example there are numbers of restrictions assigned to states of nodes. Restrictions, indicated as lines in FIG. 7, fulfilled at the time of the rendering pass relate to the nodes R3, R20 and R11. During the rendering pass the nodes are sent down the rendering pipeline 1 in sets. The first set of node data to be sent down the rendering pipeline 1 is:

N1, N2, N17, N18 and N19.

The following sets of data are:

N7;

N8, N9;

N10, N13, N14;

N15, N16;

No new matter is added.

In the example of FIG. 7 an example of restriction of a state in each of the two siblings N19, N20 may refer to if a character in a game holds a sword or a map.

Extending a Node

A user can extend any node and add restrictions to the node's children, determining which of its children that should be traversed in a user defined order.

In one embodiment the user may extend a node such that the user defines an own node, for instance MyNode, based on an existing node, such as A9Node. In the example below, the extended node comprises the methods update and renders with a restriction based on state.

```
public void MyNode extends A9Node{
    public void update(float time, Object o){
        if(state){
            super.update(time,o);
        }
    }
    public void render(A9Renderer r, Object o){
        if(state){
            super.render(r,o);
        }
    }
}
```

This enables the user to get total control over the traversal order and, hence, the order of component data and other data of nodes sent to the rendering pipeline 1. This further enables the user to express rendering algorithms as a scene graph 40. This also allows the user to build render order dependent optimizations directly into the graph, which was not possible before.

In conjunction with the rendering pass of the scene graph, data is sent down the rendering pipeline. Optimization is built in the scene graph such that no optimization is necessary in the CPU. This in contrast with previously known scene graphs, such as Java 3D, where an added node results in a CPU consuming optimization which often leads to a disturbance on the presentation on screen easily recognized by a human eye.

The invention enables that no optimization is made in the CPU of the computerized system to change the rendering order.

An example on the advantage of controlling rendering is in games, as the user desires to perform HUD rendering. First the user may render a game tree, followed by the user render a HUD branch.

```
public void display(A9Renderer r){
    gameNode.update(time,o);
    hudNode.update(time,o);
    gameNode.render(r,o);
    hudNode.render(r,o);
}
```

Lights

Yet another example of the advantage when the user controls the rendering order is when the user works with lights. When working with rendering, lights are not "real lights" but a form of shading. Shading is how the light interacts with the surface and it determines the color of pixel of the surface. Since lights are a form of shading and not a light simulation, the behaviour of the lights differ from real lights. Surfaces do not occlude or reflect light to the scene, which means that objects do not automatically cast shadows and shiny surfaces do not automatically reflect other objects. In the rendering process, each patch is treated separately and without a relation to earlier patches. Thus light phenomena, such as reflection and shadows, are a combination of different rendering techniques.

Traversal

Traversal of the scene graph is defined in two passes: the update and the render pass. This design has been chosen to be able to optimize the structure to maximize the Asymmetrical Multi Process (ASMP) behaviour of the CPU/GPU architecture. The update pass is time dependent and utilizes only CPU resources. The intended use is to update states of nodes and perform CPU heavy calculations such as animation and geometry deformations. The update pass can be run as single or multithreaded both on traversal and node level, without need of synchronization. The render pass communicates with the GPU and uses as little CPU resources as possible. The two passes allow the user to optimize the system for best possible ASMP behaviours. The architecture allows multithreaded CPU behaviour on each node in the render pass but not on the actual traversal. With single threaded traversal, data can be sent down the rendering pipeline as fast as possible without any synchronization. Multithreaded traversal when rendering makes less sense since all rendering in the end is more or less order dependent. When the data has been sent down the pipeline the GPU can start to process data independently from CPU. As the GPU is processing geometry, the CPU resources can be assigned to the update pass. The separation of update and render also allows partitioning resource between frames where only parts of the frame need to be updated in each frame.

Update

Advantageously, an implementation of the method comprises an update package as part of the API. Update enables the user to determine that certain tasks relating to data in nodes are processed in the CPU, while other data is processed by the GPU down the rendering pipeline 1. Such tasks may handle animation of geometry as defined in a geometry node. Animation is often CPU consuming. It is not the animation as such that is sent down the rendering pipeline 1 but rather the result of the animation. It is suitable to first call render followed by a call to update. The call to update is suitable to be less frequent than the call to render. For instance, render is called every frame while update is called every third frame.

An Underlying Graphical System

The system and method according to the invention enables the user to utilize the graphical system in an efficient manner. There are obvious advantages with the multiprocessor system, but there are also limitations and certain characteristics imposed by such underlying hardware. A multiprocessor system (MP) system can be either asymmetrical (ASMP) or symmetrical (SMP). In an asymmetrical system each unit takes on different jobs, and all memory is not available to all processors. Doing asymmetrical multi-processing effective requires specialized knowledge about the tasks the computerized system should perform. Together the CPU and GPU form the basis of MP system that in many cases can be viewed as being asymmetrical. The CPU and GPU are dedicated to different tasks and many GPU often have their own dedicated memory or memory area. The picture becomes even more complex if we take into account that nowadays some systems have SMP capabilities such as multiple CPU or CPU with more than one core. This is the case for both modern PC as well as embedded and handheld devices. When working in a concurrent system, optimal speed is achieved if each thread can work parallel. If threads are dependent upon each other they need to be synchronized. The actual synchronization has an overhead that might likely make threaded applications slower in non-MP systems. Synchronization might also force threads to idle and wait which waste CPU cycles.

Performance Impact and Load Balancing

The system and method according to the invention enables the user to define scene graph with semantics that improves performance compared to previously known system and methods. For instance, compared to Java3D the system and method do not need to utilize render bins. Render bins are parallel and they need to be synchronized to avoid fragmentation in the GPU, but the invention reduces the risk of excessive state changes.

Load balance is enabled and the user controls it by means of the scene graph semantics. This is not possible in Java3D. One example of this is when rendering an environment where the viewer is standing in a room with one window showing the outdoor scenery. In such examples, where all objects are simple opaque materials, the rendering order does not affect the resulting image but could have a huge impact on the performance in a fill-rate and memory bandwidth sensitive set-up. The invention enables the user to define and control the rendering order to first render the room in such a way that the majority of the pixels would be filled. Then, when rendering the outdoor scenery, most fragments would be discarded early in z-buffer test, not consuming fill rate and memory bandwidth when being written to the back buffer and eventually swapped to the screen. When using previously known scene graphs where the rendering order is not user controlled, the opposite rendering order would have consumed roughly twice the memory bandwidth since all fragments from scenery would have been written to the back buffer and discarded only when they where replaced by the fragments generated by the room.

Transform and Components

Figure 2:
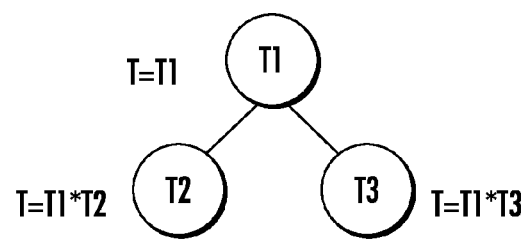
FIG. 2 shows that while traversing the scene graph transform nodes are multiplied, creating a hierarchal relationship in space.

It is an advantage if the scene graph comprises two different basic types of nodes: Transform and Components. A transform node may affect different transform stages defined in the render pipeline, such as the transform matrix, the projection matrix and the color matrix. FIG. 2 shows that while traversing the scene graph 40 transform nodes T1, T2, T3 are typically multiplied, creating a hierarchal relationship in space. The resulting transform T in transform node T1 is T1. FIG. 2 shows that the resulting transform T in node T2 is T=T1*T2.

Figure 3:
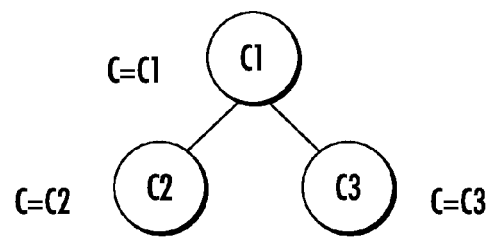
FIG. 3 indicates that when traversing the scene graph two-component nodes of the same type replace each other.

The component nodes define data, a process or a combination thereof. There may, for instance, exist components for creating processes. FIG. 3 indicates that when traversing the scene graph 40 two-component nodes of the same type replace each other. When two non-transform components of the same type, such as appearances or geometry are relative, they replace each other. When two geometry nodes in a relative order replace each other, only geometry from the last geometry node is rendered when a draw node is encountered.

All node types have in common that they preserve node integrity. The nodes isolate their state. A node is only affected by the state of its parents and output is a result of the path from the top node to the end node. Siblings do not typically affect each other. The node integrity removes the complexity of state management.

Figure 4:
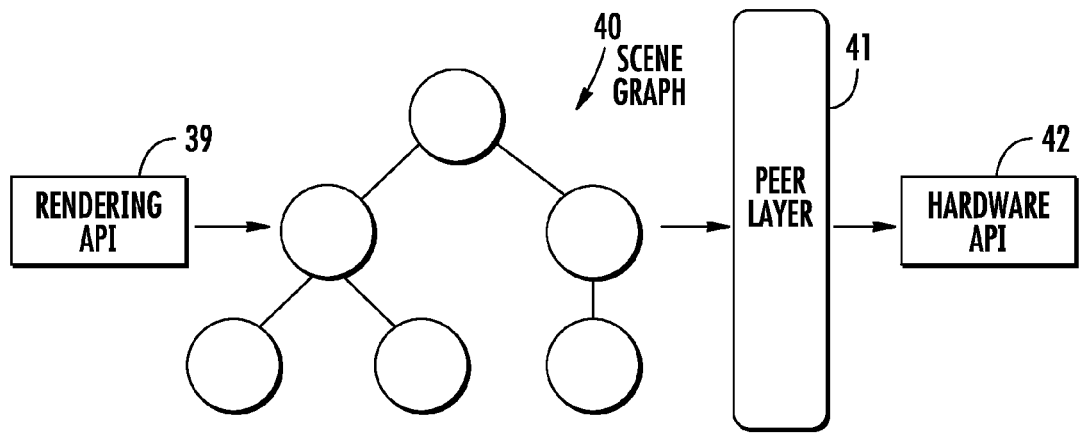
FIG. 4 shows that the rendering API is separated from the underlying hardware API, such as Direct3D or OpenGL.

FIG. 4 indicates that the rendering API 39 is separated from the underlying hardware API 42, such as Direct3D or OpenGL. The separation is achieved through a peer layer 41. The components communicate with the peer and the peer communicates with the rendering pipeline 1. This solution not only makes the scene graph 40 independent from the underlying API 42 but it also gives the ability to add optimization and smart rendering solutions.

In the peer level 88 there is a bridge 41 between the scene graph 40 and the API 42 of the rendering pipeline 1. FIG. 4 indicates a flow of graphics data between the scene graph 40 and the rendering pipeline 1. The bridge 41 manages automatically access to scene graph 40 states using uniforms. Thus the user does not need to manually assign uniforms such as matrices, lights and textures that make the development process easier and less error prone. The bridge 41 functionality also relives the dependency of states being available from the underlying hardware. This also makes a shader development transparent of the underlying API. An example of that is that the user can automatically access the texture by querying it.

Below is an example of a program accessing the texture0 scene graph state:

```
struct Output{
float4 color : COLOR;
};
Output main(float4 color : COLOR,
            float2 texCoord: TEXCOORD0,
            uniform sampler2D texture0){
    Output OUT;
    OUT.color = tex2D(texture0, texCoord);
    return OUT;
}
```

Peer Level

Figure 8:
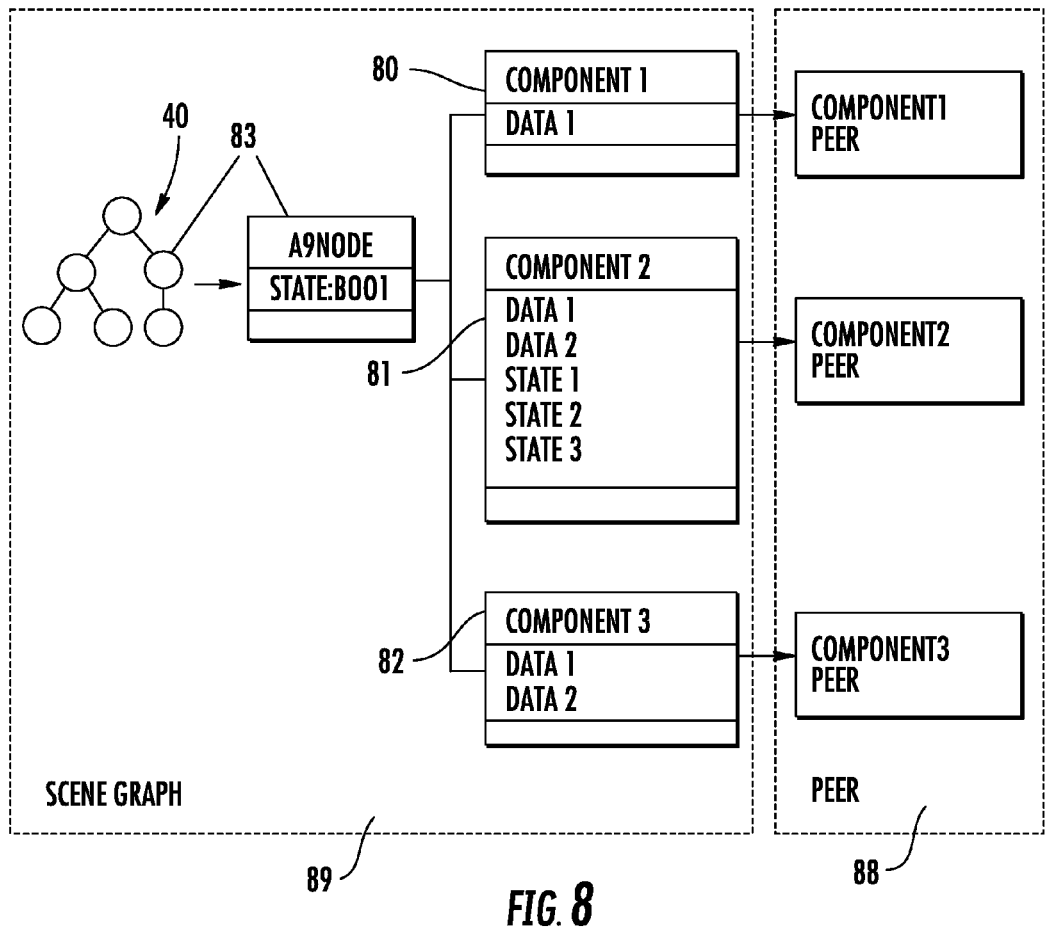
FIG. 8 is a peer level that communicates with the hardware through hardware specific functions. It is the peer level that sends the data to the GPU.

FIG. 8 shows a peer level 80 that communicates with the hardware through hardware specific functions. Components 80, 81, 82 of the scene graph level 89 communicate with the peer level 88. It is the peer level 80 that sends the data to the GPU 91. The peer level 80 may also handle lazy evaluation. A node such as the A9Node 83 may, for instance, describe geometry. Such a node comprises one or more components 80, 81, 82. The components 80, 81, 82, and more specific, data and states define a process in the rendering pipeline 1. The components 80, 81, 82 are connected with the rendering pipeline 1 through the peer level 88, wherein the components are separated from the underlying hardware.

Cache

Figure 9:
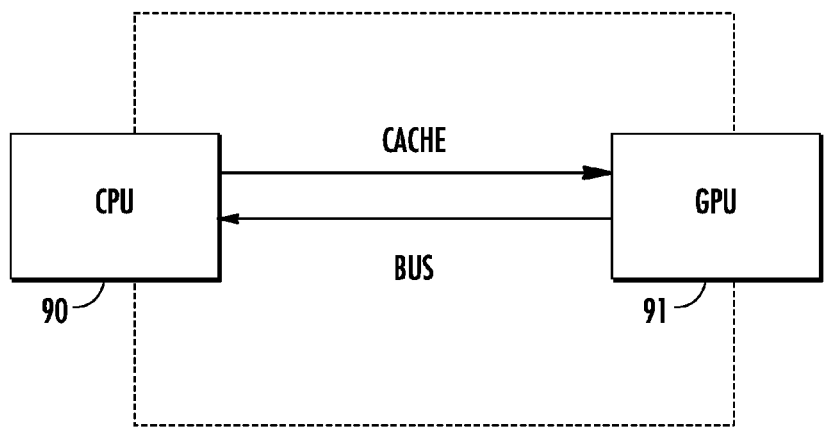
FIG. 9 shows that the CPU and the GPU typically communicate by means of a bus. A cache is frequently used in order to send data down the rendering pipeline to the GPU.

FIG. 9 shows that the level between the CPU 90 and the GPU 91 typically comprises a cache. Such a cache area is used for preparing processes derived from components in nodes before they are sent further down the rendering pipeline 1 to the GPU, further as primitives to the screen. Communication between the CPU 90 and GPU may be performed by means of a bus such as AGP bus.

A Computerized System

FIG. 10 illustrates an example of a suitable computerized system environment 92 in which the invention may be implemented. The computerized system 92 is only one example of a suitable computing environment and is not intended to suggest any limitation as to the scope of use or functionality of the invention. The invention is operational with numerous of other general purpose or special purpose computer system environments or configurations. Examples of well known computerized systems, environments, and/or configurations that may be suitable for use with the invention include, but are not limited to, personal computers, server computers, game consoles, mobile phones, PDAs, handheld devices, lap top devices, set top boxes or programmable consumer electronics. The computerized system comprises the CPU/GPU, which are typically connected by a bus, such as AGP or PCIx in the case of a PC system. Many GPU systems today have their own dedicated memory. This architecture can both be found in modern PC and workstations as well as future handhelds, mobile phones, game consoles and other similar units previously mentioned. The computerized system comprises a screen on which 3D-graphics, as well as other graphics or text are displayed. The computerized system 92 typically includes a variety of computer-readable media. Computer-readable storage media can be any available media that can be accessed by the computer 93 and includes both volatile and non-volatile media. Example of computer storage media includes, but is not limited to, RAM, ROM, EEPROM, USB memory stick, flash memory or other memory technology, CD-ROM, digital versatile disks (DVD) or other optical disk media. Drives of the computerized system 92 and their associated computer storage media, provide storage of computer-readable instructions, data structures, program modules and other data for the computerized system 92.

Redundant State Changes

In an embodiment lazy evaluation is implemented in the peer level. The lazy evaluator removes redundant state changes. In the determining step it is decided if the state of an object found in a node is to be sent down the rendering pipeline, depending on if the state has previously been found in another object or in the object itself. An example is that the same texture may occur in several nodes or several times in the same node.

FIG. 11 is an overview of the method according to the invention. Several other flow charts of the method are possible. Steps may be in other order. Some steps may be left out and other steps added. Following the start 50 of the method is a step for assembling 51 nodes to the scene graph 40. The user defines 52 order of the nodes of the scene graph, hence the rendering order, by the position of the node. When all nodes have been assembled 53, a first node N1 is set as start of traversal of the scene graph 40. The traversal of the rendering pass is started 55. A computer program of the system software determines 56 if the nodes of the scene graph are to be traversed. In one embodiment the determining step is implemented as a bool operation, such as evaluating an "if" statement, comprised in an extended node relating to a state of a node. In such an embodiment, a left out "if" statement results in children being traversed. A computer program of the system software sends 57 scene graph data down the rendering pipeline 1. The update pass 58 is partly executed parallel to the rendering pass. As the scene progresses, the main body of the method is repeated 59.

Examples of Class Definitions

Below are a number of class definitions that are implemented in an embodiment of the invention. Several other embodiments are possible.

com.agency9.render
Class A9Node
java.lang.Object
　com.agency9.render.A9Node
Direct Known Subclasses:
A9AppearanceNode, A9BufferNode, A9ClipNode, A9FragmentOperationsNode, A9GeometryDrawNode, A9GeometryNode, A9LightNode, A9 ParticleSystem, A9PortalSystem, A9ProgressScreen, A9Section, A9ShaderNode, A9Skybox, A9Source, A9TransformNode, A9TreeNode, A9UpdateControlNode, A9ViewFrustumCullNode,
A9ViewNode
Constructor Summary:
public class A9Node
extends Object; A9Node is in an embodiment the primary class for the scene graph 40. In such an embodiment, all classes within the scene graph 40 must extend A9Node.
A9Node( ); Creates a new instance of node.
A9Node(int initialSize); Creates a new instance of node
Method Summary:
void addChild(A9Node node); Adds a child to this node
void addChild(A9Node node); Adds a child to this node
A9Node getchild(int index); Returns the child node at the given index.
String getName( ); Return the name of this node.
A9Renderer getRenderero;
Boolean removeChild(A9Node node); Removes the given child node
void render(A9Renderer r, Object obj); Renders this node and all of its children
void update(float time, Object o); Updates this node and all of its children
Class A9Renderer
java.lang.Object
　com.agency9.render.A9Renderer
public class A9Renderer
extends Object
Constructor Summary:
A9Renderer( )
A9Renderer(A9ViewNode view, A9AppearanceNode apperance,
A9BufferNode buffer, A9GeometryNode geometry,
A9TransformNode transform, A9ShaderNode shader,
A9LightNode light, A9FragmentOperationsNode fragment,
A9Matrix4x4f transformmatrix,
A9Matrix4x4f projectionMatrix, A9Matrix4x4f colorMatrix,
A9ClipNode clipNode, A9Frustum frustum)
Method Summary:
public void setview(int x, int y, int w, int h);
public void setRenderer(A9ViewNode view,
A9AppearanceNode apperance, A9BufferNode buffer,
A9GeometryNode geometry, A9Transf
public void setview(int x, int y, ormNode transform,
A9ShaderNode shader, A9LightNode light,
A9FragmentOperationsNode fragment,
A9Matrix4x4f transformMatrix,
A9Matrix4x4f projectionMatrix,
A9Matrix4x4f colorMatrix,
A9ClipNode clipNode,
A9Frustum frustum)
public A9AppearanceNode getApperanceNode( )
public A9BufferNode getBufferNode( )
public A9GeometryNode getGeometryNode( )
public A9TransformNode getTransformNode( )
public void setApperanceNode(A9AppearanceNode apperance)
　Parameters: apperance—
public void setBufferNode(A9BufferNode buffer)
　Parameters: buffer—
public void setGeometryNode(A9GeometryNode geometry)
　Parameters: geometry—
public void setTransformNode(A9TransformNode transform)

Parameters:
transform—
    public A9Projector projector( )
public A9Frustum frustum( )
public net.java.games.jogl.GL getGL( )
public net.java.games.jogl.GLU getGLU( )
public net.java.games.jogl.GLDrawable getGLDrawable( )
public net.java.games.jogl.GLU getGLU( )
public net.java.games.jogl.GLDrawable getGLDrawable( )
public A9RendererParamaters paramaterList( )
public A9Renderer getclone( )
public A9Renderer getClone(A9Renderer r)
public A9Matrix4x4f getAbsoluteProjectionMatrix( )
public A9Matrix4x4f getAbsoluteTransformMatrix( )
public A9Matrix4x4f getAbsoluteColorMatrix( )
public void setAbsoluteProjectionMatrix(A9Matrix4x4f matrix4x4f) Parameters: matrix4x4f—
public void setAbsoluteColorMatrix(A9Matrix4x4f matrix4x4f) Parameters:matrix4x4f—
public void setAbsoluteTransformMatrix(A9Matrix4x4f matrix4x4f) Parameters:matrix4x4f—
public A9LightNode getLightNode( )
public void setLightNode(A9LightNode node)
public A9ShaderNode getShaderNode( )
public void setShaderNode(A9ShaderNode node)
public A9FragmentOperationsNode
   getFragmentOperationNode( )
public void
    setFragmentOperationNode
(A9FragmentOperationsNode node)
public A9ViewNode getViewNode( )
public void setViewNode(A9ViewNode node)
    Parameters: node—
public A9ClipNode getClipNode( )
public void setClipNode(A9ClipNode node)
    Parameters: node—
public int getHeighto
public int getwidth( )
public int getx( )
public int gety( )
public A9Frustum getProjectionFrustum( ); Returns a A9Frustum in root/identity space. The frustum equals a frustum created by new A9Frustum(absoluteProjection, identityMatrix) Returns: Returns the frustum.
public void setProjectionFrustum(A9Frustum frustum); Set a A9Frustum in root/identity space. The frustum should equal a frustum created by new A9Frustum(absoluteProjection, identityMatrix)
    Parameters: frustum—The frustum to set.
Class A9GeometryDrawNode
Java.lang.Object
    com.agency9.render.A9Node
    com.agency9.render.draw.A9GeometryDrawNode
public class A9GeometryDrawNode
extends A9Node
Constructor Summary:
A9GeometryDrawNode( ); Creates a new A9GeometryDrawnNode with the default configuration.
A9GeometryDrawNode(A9CoreDrawComponent comp); Creates a new A9GeometryDrawnNode with the default configuration and the given draw component.
Method Summary:
A9CoreDrawComponent getDrawComponent( ); Return the draw component associated with this instance.
void render(A9Renderer r, Object o); Renders this node and all of its children.
void setDrawComponent(A9CoreDrawComponent component); Sets a draw component to this instance.
A9Node shared( ); Return a new node sharing components with this node.
Class A9AppearanceNode
java.lang.Object
    com.agency9.render.A9Node
    com.agency9.render.appearance.A9AppearanceNode
public class A9AppearanceNode
extends A9Node; Defines the appearance of geometry surface. Every texture assigned to this node will be available as a uniform within Cg. The uniforms will be labelled; texture0, texture1 . . . texturen. The material variables is also available in Cg as uniforms.
Method Summary
void addTextureUnit(A9TextureUnit unit); Adds a texture unit to this node.
A9Material getMaterial( ); Return the material assigned to this node.
boolean hasTextureUnits( ); Test if this node has any texture units assigned to it.
void init(A9Renderer r); Initializes this appearance.
void removeAllTextureUnits( ); Remove all texture units accoiated with this node.
void render(A9Renderer r, Object obj); Renders this node and it's children.
void setMaterial(A9Material material); Sets (assigns) a material to this node.
Interface A9AppearanceComponentPeer
com.agency9.render.peer
All Known Implementing Classes: A9CubeMapTexturePeerImpl, A9MaterialPeerImpl, A9Texture3DPeerImpl, A9TextureAttributesPeerImpl, A9TexturePeerImpl
Method Summary
public void compile(A9Renderer r, A9AppearanceComponent comp);
public void disable(A9Renderer r, A9AppearanceComponent comp);
public void enable(A9Renderer r, A9AppearanceComponent comp);
Class A9Blender
java.lang.Object
com.agency9.render.fragmentoperations.A9FragmentOperation
    com.agency9.render.fragmentoperations.A9Blender
Implemented Interfaces: A9BlenderConstants
Constructor Summary
A9Blender( );
A9Blender(A9Configuration configuration);
A9Blender(A9FragmentOperationPeer peer);
Method Summary
static A9Blender create(A9Configuration configuration);
void disable(A9Renderer r);
int getDestinationFunction( );
int getSourceFunction( );
void render(A9Renderer r);
void setBlendFunction(int source, int dest);
void setDestinationFunction(int i);
void setSourceFunction(int i);
Constructor
public A9Blender( );
public A9Blender(A9Configuration configuration);
public A9Blender(A9FragmentOperationPeer peer);
    It should be understood that this description is exemplifications of the invention and it should not limit the scope of the invention or its underlying idea.

The invention claimed is:

1. A computer-implemented method for rendering a scene graph that comprises 3D graphical data in a computerized system, wherein the computerized system comprises a CPU and a GPU, the method comprising:
receiving a plurality of nodes and an order for assembling the nodes from a user;
constructing a scene graph by assembling the plurality of nodes in the order defined by the user;
receiving a selection by the user of a first node from the plurality of nodes as a starting point for traversal of the scene graph, wherein any node in the scene graph may be selected by the user as the starting point;
determining a rendering pipeline comprising a rendering order defined by the user based on the first node in the scene graph;
sending scene graph data down the rendering pipeline;
receiving a second node for inclusion in the scene graph from the user, wherein a position of the second node in the scene graph is chosen by the user, and wherein the second node comprises an algorithm for 3D graphical presentation; and
changing the rendering order based on the position of the second node in the scene graph.

2. The method according to claim 1, further comprising:
traversing the scene graph in the changed rendering order defined by the user without updating system software that is performing rendering in the rendering pipeline.

3. The method according to claim 2, further comprising:
sending the scene graph data down the rendering pipeline in the changed rendering order defined by the user without updating system software that is performing rendering in the rendering pipeline.

4. The method according to claim 3, wherein sending scene graph data down the rendering pipeline is performed in the changed order defined by the user without the system software optimizing the order of rendering in the CPU.

5. The method according to claim 4, further comprising:
updating states in nodes wherein processes are started and executed in the CPU, wherein updating states of nodes is performed as an update pass initiated by a method accessible to the user in an application programming interface, and
handling node data in the GPU as a result of a call to a render method, and that at least partly in parallel as updating states in nodes in the CPU, wherein the method supports an asynchronous multiprocessor approach.

6. The method according to claim 5, wherein updating states in nodes is multithreaded.

7. The method according to claim 4, wherein while performing a render pass, sending data down the rendering pipeline in sets of data, where each set of data is sent as a result of a draw node that is encountered during traversal of the scene graph, and the set of data is derived from nodes above the draw node.

8. The method according to claim 4, further comprising:
evaluating if components of a node previously were sent down the rendering pipe line, and if previously sent, the components of the node are not sent again.

9. The method according to claim 4, further comprising:
handling lazy evaluation of a node, and
deciding if data related to a state of the node is to be sent down the rendering pipe line depending on if the same data was previously sent from another node, and if previously sent the data is not sent again.

10. The method according to claim 9, wherein handling lazy evaluation is enabled by an appearance node, on a higher level in the scene graph than the evaluated node.

11. The method according claim 10, wherein the state in the handling lazy evaluation relates to a texture.

12. The method according to claim 11, wherein handling lazy evaluation is enabled by a shader node on a higher level in the scene graph than the evaluated node, and the data relates to a shader program.

13. The method according to claim 4, further comprising:
accessing the scene graph states by means of a bridge between the scene graph and the rendering pipeline using uniforms.

14. The method according to claim 13, further comprising:
automatically using uniforms, wherein states of the scene graph also exists as uniforms.

15. The method according to claim 4, wherein traversing the scene graph is performed as top-bottom to left-right, in a depth first recursive manner.

16. The method according to claim 4, wherein determining if a child of a node is to be traversed is performed on a node that is extended with a restriction based on at least one state, the extension being performed before the node is added to the scene graph.

17. The method according to claim 4, further comprising:
sending data to the GPU by means of a peer level, and
connecting data and states of nodes to processes in the rendering pipe line.

18. The method according to claim 1, wherein the second node is added to the scene graph after the scene graph data has been sent down the rendering pipeline.

19. The method according to claim 1, further comprising:
receiving a state from the user for at least one node, wherein the state restricts a child of the node from being traversed unless a condition is fulfilled; and
controlling the rendering order based at least in part on the condition.

20. The method according to claim 19, wherein traversal of the scene graph is controlled by the order of the nodes in the scene graph, the starting point for traversal of the scene graph, and the state restricting traversal unless a condition is met, wherein each of the order, the starting point, and the state is received from the user.

* * * * *